United States Patent
Mudumbai et al.

(10) Patent No.: US 10,853,046 B2
(45) Date of Patent: Dec. 1, 2020

(54) DEPLOYMENT OF SOFTWARE APPLICATIONS ON SERVER CLUSTERS

(71) Applicant: salesforce.com, inc., San Francisco, CA (US)

(72) Inventors: Gopi Krishna Mudumbai, Hyderabad (IN); Ram Narsimhamurty Mantri Pragada, Manikonda (IN); Jayant Kumar, Hyderabad (IN)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/219,784

(22) Filed: Dec. 13, 2018

(65) Prior Publication Data

US 2020/0192651 A1    Jun. 18, 2020

(51) Int. Cl.
| | |
|---|---|
| *G06F 8/61* | (2018.01) |
| *G06F 8/65* | (2018.01) |
| *H04L 29/08* | (2006.01) |
| *H04L 12/26* | (2006.01) |
| *G06F 16/25* | (2019.01) |
| *H04L 12/24* | (2006.01) |

(52) U.S. Cl.
CPC .................. *G06F 8/61* (2013.01); *G06F 8/65* (2013.01); *G06F 16/252* (2019.01); *H04L 41/14* (2013.01); *H04L 43/062* (2013.01); *H04L 67/34* (2013.01); *H04L 67/10* (2013.01)

(58) Field of Classification Search
CPC ........................................................ G06F 8/61
USPC ........................................................ 717/172
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

*Primary Examiner* — Wei Y Zhen
*Assistant Examiner* — Clint Thatcher
(74) *Attorney, Agent, or Firm* — Weaver Austin Villeneuve & Sampson LLP

(57) ABSTRACT

Disclosed are some implementations of systems, apparatus, methods and computer program products for deploying software applications on server clusters. Characteristics of the server clusters are used to generate a deployment plan indicating an order in which the server clusters are to be updated and a timing with which the server clusters are to be updated. The characteristics of a server cluster can include a risk rating associated with the server cluster, an amount of traffic processed by the server cluster, and/or a size of the server cluster.

20 Claims, 9 Drawing Sheets

(56) References Cited

U.S. PATENT DOCUMENTS

| | | |
|---|---|---|
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshaysky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,497,136 B1 * | 11/2016 | Ramarao ............... G06F 9/5072 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |

(56) References Cited

U.S. PATENT DOCUMENTS

| | | |
|---|---|---|
| 2009/0177744 A1 | 7/2009 | Marlow et al. |
| 2011/0218958 A1 | 9/2011 | Warshaysky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0266156 A1* | 10/2012 | Spivak .................. G06F 9/5055 717/172 |
| 2012/0290407 A1 | 11/2012 | Hubbard et al. |
| 2013/0036413 A1* | 2/2013 | Venkatesan ............... G06F 8/65 717/172 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |
| 2016/0357660 A1* | 12/2016 | Dean .................. G06F 11/3692 |
| 2019/0294528 A1* | 9/2019 | Avisror ..................... G06F 8/65 |
| 2019/0332369 A1* | 10/2019 | Gupta ....................... G06F 8/60 |
| 2020/0012493 A1* | 1/2020 | Sagy ...................... H04L 43/08 |

\* cited by examiner

Server Cluster Characteristics

| Cluster Identifier | Cluster 1 | Cluster 2 | Cluster 3 | Cluster N |
|---|---|---|---|---|
| Risk rating | 1 | 2 | 3 | 2 |
| Amount of traffic | 10,000 | 100,000 | 155,000 | 132,000 |
| Size | 6 | 3 | 4 | 5 |

DEPLOYMENT OF SOFTWARE APPLICATIONS ON SERVER CLUSTERS

COPYRIGHT NOTICE

A portion of the disclosure of this patent document contains material, which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to systems and techniques associated for deploying software on servers. More specifically, this patent document discloses techniques for generating and using a deployment plan to deploy software on server clusters.

BACKGROUND

"Cloud computing" services provide shared resources, software, and information to computers and other devices upon request. In cloud computing environments, software can be accessible over the Internet rather than installed locally on in-house computer systems. Cloud computing typically involves over-the-Internet provision of dynamically scalable and often virtualized resources. Technological details can be abstracted from the users, who no longer have need for expertise in, or control over, the technology infrastructure "in the cloud" that supports them.

One type of cloud computing service that is widely used is software deployment tools. Software deployment tools are generally used to deploy software and associated updates. Many of these software deployment tools support the simultaneous deployment of software on multiple target computers. In addition, a number of software deployment tools support the automated deployment of software according to a user-specified schedule.

BRIEF DESCRIPTION OF THE DRAWINGS

The included drawings are for illustrative purposes and serve only to provide examples of possible structures and operations for the disclosed systems, apparatus, methods and computer program products for facilitating authentication of computing system requests across tenants of a multi-tenant database system. These drawings in no way limit any changes in form and detail that may be made by one skilled in the art without departing from the spirit and scope of the disclosed implementations.

FIG. 2 shows an example of server cluster characteristics 200 that are used to generate a deployment plan for deploying software on server clusters, in accordance with some implementations.

DETAILED DESCRIPTION

Figure 1:
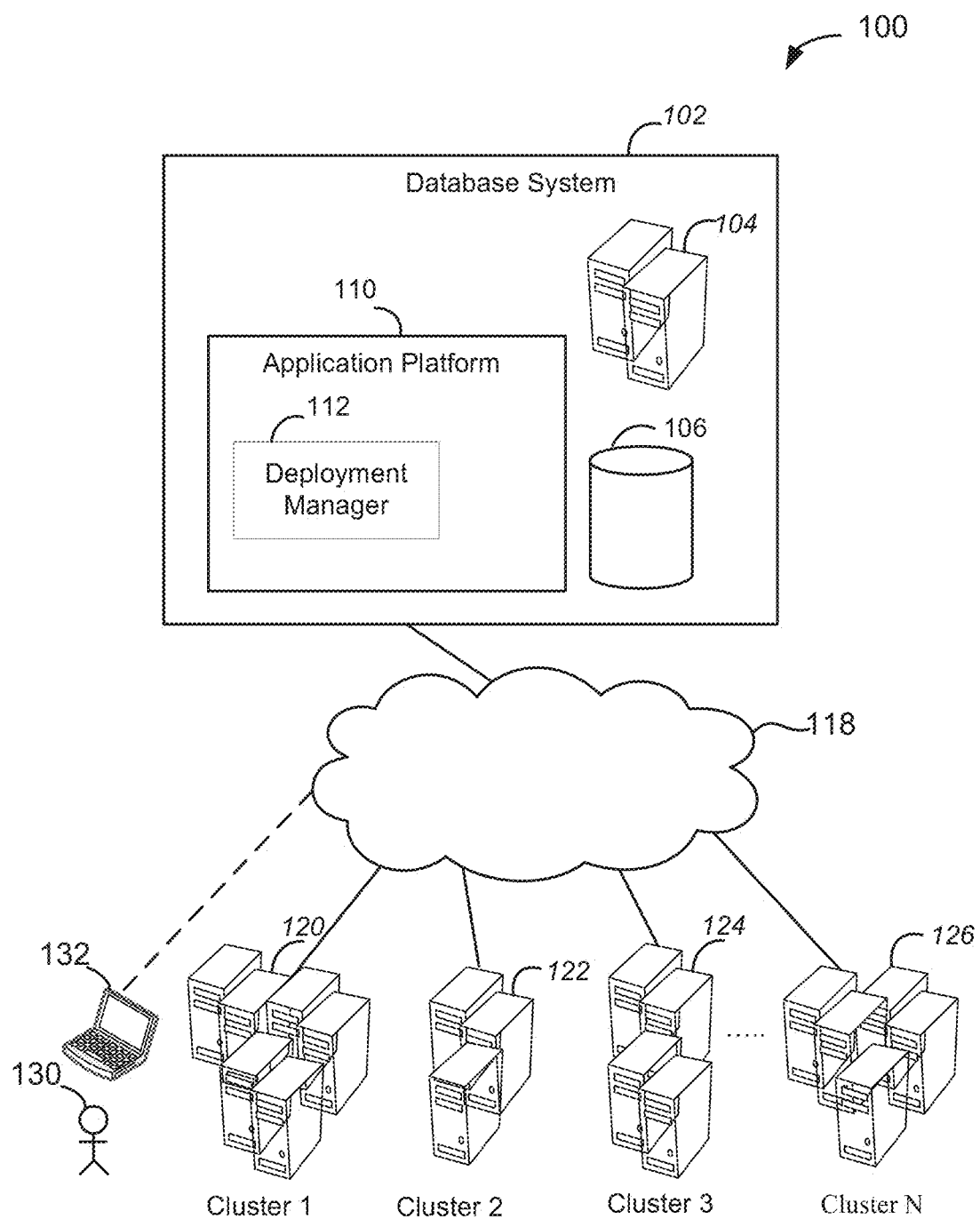
FIG. 1 shows a system diagram of an example of a system 100 in which deployment of software on server clusters may be facilitated, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations described or referenced herein are directed to different systems, methods, apparatus, and computer program products for facilitating deployment of software on server clusters. Characteristics of the server clusters are used to generate a deployment plan, which is used to manage deployment of software on the server clusters. In some implementations, the deployment plan indicates an order in which the software is to be deployed on the server clusters and a timing with which the software is to be deployed on the server clusters. In some implementations, the deployment plan is updated in real-time as the software is deployed on the server clusters.

Software may include a software application or an associated update. A software application or associated update may include computer-readable instructions configured to perform a variety of functions or tasks. Typically, a software application or associated update includes one or more files. The files can include one or more code modules. In addition, the files can include metadata and/or data that facilitates execution of the software application.

Each of the characteristics of a server cluster may be statically assigned or dynamically ascertained. Example characteristics of a server cluster include, but are not limited to, a size of the server cluster indicating a number of servers in the server cluster, an amount of traffic processed by the server cluster, type(s) of traffic processed by the server cluster, and/or a risk rating assigned to the server cluster.

In some implementations, a risk rating assigned to a particular server cluster may indicate a level of risk associated with the deployment of software on the server cluster. In some implementations, the risk rating indicates a priority with which the server cluster is to be updated. In some implementations, the risk rating indicates an order in which the server cluster is to be updated in relation to other server clusters.

In some implementations, a tenant database system is used to maintain data for each tenant computing system, and the tenant database system can be in the form of at least one multi-tenant database system. The tenants of the tenant database system may include various organizations of users who interact with cloud-based applications running on the tenant database system or on platform(s) associated with the tenant database system. Each organization of users may have associated therewith one or more tenants of the tenant database system.

In some implementations, each of the server clusters may be associated with a corresponding tenant database system. In some implementations, each of the server clusters is associated with a particular tenant of a multi-tenant database system. Each of the server clusters may be associated with an organization of users. An organization or tenant may have associated therewith one or more server clusters.

In database oriented computing systems and environments in which the present techniques can be implemented, the actions of users when interacting with cloud-based applications such as those deployed by a software deployment manager or associated software deployment tool may cause data to be accessed from the tenant database system, cause data to be generated and stored in the tenant database system, or cause data to be modified in the tenant database system. Non-limiting examples of system events corresponding to user activity include, by way of illustration, a login or a logout, a uniform resource identifier (URI) which may represent a page click and view, an application programming interface (API) call, a record access, a page request, or other type of system request.

A software application that is running on server clusters may be updated as subsequent versions of the software are available. However, since the software application may be running on hundreds or thousands of server clusters, it can be difficult to manage deployment of a subsequent version of the software application or a software update to the software application. As will be described in further detail below, various implementations facilitate the deployment of software on server clusters. The software that is deployed can include a software application or an update to a software application.

By way of illustration, Acme Corporation may purchase a set of tenants that facilitates managing business operations. The set of tenants stores and processes data such as customer data. Customer data can include, for example, customer contact information, customer orders, and cases representing issues reported by customers. In addition, the set of tenants may store information pertaining to available products such as features of each of the available products, customers that have purchased the products, issues that have been reported for the products, and steps that have been performed to resolve the issues.

In this example, business software that is used by sales employees of Acme Corporation is installed on five server clusters A-E. The business software enables sales employees to access customer data via a website.

An employee of Acme Corporation, Randall, working in the Information Technology (IT) Department is responsible for ensuring that the business software accessed by sales employees of Acme Corporation is operating and functional. As the business software is updated, Randall is responsible for ensuring that updates to the business software are deployed in a timely manner without disrupting business operations.

Randall opens a software deployment tool and accesses a user interface of the software deployment tool to initiate deployment of a software update to the business software. A deployment manager of the software deployment tool generates a deployment plan based upon server cluster characteristics including a risk rating, size, and amount of traffic processed. Since server cluster B is the largest server cluster, it handles the largest amount of traffic and supports the largest organization of users within Acme Corporation. In addition, server cluster B has been assigned the highest risk rating since the sales organization supported by cluster B supports Acme Corporation's most important customers. The deployment plan indicates that the server clusters are to be updated in the following order: C, A, D, E, B. In addition, the deployment plan indicates times at which the software update is to be deployed on each of the server clusters. The deployment manager automatically deploys the software update to the five server clusters according to the deployment plan.

During the deployment, the deployment manager monitors progression of the deployment on the server clusters and as the deployment progresses, the deployment manager updates a confidence measure of the deployment. Initially, the confidence measure is 20 percent. After the software update has been successfully deployed on server clusters C, A, D, and E, the confidence measure is 99.5 percent. Since the confidence measure is greater than a minimum confidence threshold (e.g., 90 percent) associated with the highest risk rating, the deployment manager proceeds with updating server cluster B.

In accordance with various implementations, deployment of software on server clusters is managed in an automated fashion by a deployment manager that generates and applies a deployment plan. The software can include a software application or a software update to a software application that has previously been installed on the server clusters. A software update can include only changes to a software application that has previously been installed while excluding portions of the software application that have not been changed. The changes can include a deletion of a segment of the software application, an addition of a segment to the software application, and/or a modification to a segment of the software application. A software application or associated update can include computer-readable instructions, data, and/or metadata. Various methods and systems for operating a deployment manager will be described in further detail below.

FIG. 1 shows a system diagram of an example of a system 100 in which deployment of software on server clusters may be facilitated, in accordance with some implementations. In FIG. 1, a tenant database system 102 associated with an organization includes any number of computing devices such as servers 104. The servers 104 are in communication with one or more storage mediums 106 configured to store and maintain relevant data and/or metadata used to perform some of the techniques disclosed herein, as well as to store and maintain relevant data and/or metadata generated by the techniques disclosed herein. For example, storage mediums 106 can store server characteristics, a deployment plan generated using the server characteristics, configuration files, and/or any data structures used to manage deployment. In addition, storage mediums 106 can store one or more software applications and/or software updates that may be deployed in accordance with the techniques described herein. Storage mediums 106 can also include tenant data storage configured to store and maintain tenant data generated by or otherwise maintained by tenants of tenant database system 110. Tenant data can include, for example, database records corresponding to clients, contacts, orders, cases, etc.

Tenant database system 102 also includes application platform 110. Application platform 110 of tenant database system 102 may be a framework that allows applications of the tenant database system 102 to run. For example, application platform 110 may include hardware and/or software, e.g., the operating system. In some implementations, application platform 110 supports the creation, managing and executing of one or more applications.

In this example, application platform 110 is configured to execute deployment manager 112. Deployment manager 112 includes computer-readable instructions configured to generate a deployment plan for deploying software via a network 118 on a plurality of server clusters 120, 122, 124, 126 and automatically deploy software on the server clusters 120, 122, 124, 126 according to the deployment plan. In some implementations, deployment manager 112 executes according to a configuration file, which may identify server clusters, servers within the server clusters, risk ratings or other server characteristics, and/or file(s) containing the software being deployed. Deployment manager 112 may access server characteristics stored in storage mediums 106, generate a deployment plan using the server characteristics, and store the deployment plan in storage mediums 106, as will be described in further detail below.

In some implementations, deployment manager 112 generates and updates the deployment plan in real-time. More particularly, deployment manager 112 may modify the deployment plan in real-time as the deployment progresses and/or server cluster characteristics change. Server cluster characteristics or a portion thereof may be generated and/or modified in real-time by servers 104. For example, servers 104 may determine an amount of traffic and/or type of traffic processed by server clusters 120, 122, 124, 126.

In some implementations, deployment manager 112 is configured to obtain or identify software including a software application or software update to a software application and deploy the software onto server clusters 120, 122, 124, 126, shown as clusters 1-N, according to the deployment plan. Although four server clusters are shown in this example, the deployment manager 112 may deploy software to any number of server clusters. The software can be obtained or identified, for example, via a user interface or from storage mediums 106.

Storage mediums 106 may further store computer-readable instructions configured to perform some of the techniques described herein. In addition, the tenant storage may store metadata, data, or other information received and/or generated by a tenant as described herein.

In some implementations, tenant database system 102 is also configured to store privilege information identifying or specifying access rights and restrictions of users according to various attributes such as a specified user ID, type of user, role of user, a community to which the user belongs, and/or a particular organization on behalf of which a community is maintained. Each of the communities may be operated on behalf of an organization. Each organization may have associated therewith one or more tenants, which may each be associated with one or more communities. Each tenant, organization, or community may be supported by a different set of server clusters.

In the following examples, it is assumed that a user 130 accessing deployment manager 112 via a computing device 132 has access rights to deployment manager 112. User 130 can initiate execution of deployment manager 112 via interaction with a graphical user interface (GUI). In some implementations, user 130 or another user can configure the deployment manager via a GUI or, alternatively, by providing or identifying a configuration file. For example, server cluster identifiers, a location or identifier of software file(s) being deployed, and/or server characteristics such as risk ratings may be configured by a user and/or via a configuration file.

During execution of deployment manager 112, deployment manager 112 may access server cluster characteristics from storage mediums 106 to generate a deployment plan. Examples of server cluster characteristics that may be used to generate a deployment plan will be described in further detail below with reference to FIG. 2.

FIG. 2 shows an example of server cluster characteristics 200 that are used to generate a deployment plan for deploying software on server clusters, in accordance with some implementations. In this example, server cluster characteristics are stored for each one of a plurality of server clusters 1-N, represented as server clusters 120, 122, 124, 126 in FIG. 1. As shown in this example, server cluster characteristics 200 for each of the server clusters can include a risk rating assigned to the server cluster, an amount of traffic handled by the server cluster, and/or a size of the server cluster.

In this example, the risk rating is a numerical value, where server clusters 120, 122, 124, 126 are assigned risk ratings 1, 2, 3, 2, respectively. The risk rating can indicate a level of risk associated with a software deployment to the corresponding server cluster. The risk rating can also indicate a level of importance of tenant(s) or organization(s) supported by the server cluster. In some implementations, the risk ratings associated with the server clusters are statically configured.

A risk rating for a particular server cluster may be generated based, at least in part, on various factors. Such factors include, but are not limited to, a license type of customers using the server cluster, a level of importance of customers using the server cluster, a traffic type processed by the server cluster, and/or geographical location of the server cluster. Geographical location may be significant since some markets are more sensitive to server downtime than other markets. In some implementations, traffic type can indicate whether traffic is production traffic or test traffic.

An amount of traffic processed by a server cluster can include one or more numerical values that indicate the amount of traffic processed by the server cluster. Each of the numerical values can indicate an amount of a particular type of traffic processed by the server cluster. A numerical value can indicate a number of requests or packets processed by the server cluster within a particular period of time (e.g., seconds, milliseconds, etc.). In this example, the amount of traffic processed by server clusters 1-N include 10,000 requests per millisecond, 100,000 requests per millisecond, 155,000 requests per millisecond, and 132,000 requests per millisecond, respectively.

A size of a server cluster can indicate a number of servers within the server cluster. For example, the size can include an indicator such as a numerical value that specifies a particular number of servers in the server cluster. In this example, server clusters 1-N contain 6, 3, 4, and 5 servers, respectively. As another example, the size can include an indicator of a size categorization such as small, medium, and large, where each size categorization corresponds to a numerical range of values indicating number(s) of servers, within a server cluster, that would fall within the corresponding category.

In this example, three different server cluster characteristics are shown. However, it is important to note that these examples are merely illustrative. Thus, server cluster characteristics used to generate a deployment plan can include any number of server cluster characteristics and may include some or all of the server cluster characteristics shown in FIG. 2. In addition, server cluster characteristics can include further server cluster characteristics such as type of traffic processed by the server cluster, memory size of servers in the server cluster, and/or processor type of processors of the server cluster.

Figure 3:
FIG. 3 shows an example of a deployment plan 300 for facilitating deployment of software on server clusters, in accordance with some implementations.

FIG. 3 shows an example of a deployment plan 300 for facilitating deployment of software on server clusters, in accordance with some implementations. In some implementations, deployment plan 300 can indicate a deployment order in which the software is to be sequentially deployed on server clusters 1-N. The deployment order can be implicit or explicit. In this example, the deployment order indicates that the software is to be deployed on cluster 3, then cluster 1, then cluster N, and then cluster 2. Software may be deployed sequentially or simultaneously onto servers within a given cluster.

In some implementations, deployment plan 300 indicates a timing with which software is to be deployed on the server clusters 1-N. The timing may be implicit or explicit. More particularly, deployment plan 300 may indicate a scheduled time at which deployment of the software is to be initiated for each of the server clusters 1-N. In this example, deployment of the software is to be initiated at 1:15 for server cluster 3, 3:35 for server cluster 1, 5:45 for server cluster N, and 7:45 for server cluster 2. The scheduled deployment time for each server cluster may be explicit or implicit. For example, scheduled deployment times may be ascertained from scheduled "elapsed times" for the server clusters, where each of the scheduled elapsed times indicates a time period that will have elapsed since the initiation of the software deployment for the server clusters.

In some implementations, deployment plan 300 may indicate a scheduled delay time between the deployment of software on two different clusters or incorporate such a scheduled delay time into the scheduled times at which deployment is to be initiated for the server clusters. The delay time may be the same for all of the server clusters during the deployment or, alternatively, may differ for different server clusters or cluster pairs. A delay time may be introduced into the deployment process to ensure that there is time to verify that deployment of software on a given server cluster is free of errors before proceeding to deploy the software on another server cluster. For example, the deployment manager may monitor operation of a server cluster or data generated by the server cluster to verify that deployment of the software on the server cluster was successful.

In some implementations, the deployment manager may ascertain the timing with which deployment of the software is to be initiated for each of the server clusters 1-N based, at least in part, on the number of file(s) and/or size of the file(s) being deployed. In addition, the deployment manager may ascertain the timing with which deployment of software is to be performed on the server clusters 1-N based, at least in part, on historical data pertaining to deployment of a previous release of the software. The deployment manager may also use historical data pertaining to deployment of other software having a similar number of files and/or having files of a similar size or characteristics as the software being deployed. The historical data can indicate, for example, an average or approximate time for processor(s) to complete deployment for a single server or for a server cluster of a particular size.

Figure 4:
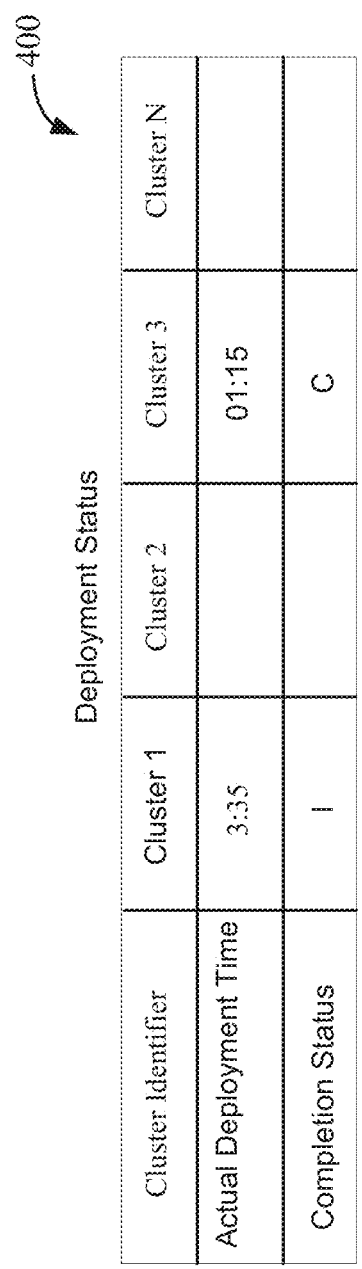
FIG. 4 shows an example of a data structure 400 storing a deployment status for server clusters during software deployment, in accordance with some implementations.

The deployment manager may monitor the progress of the software deployment on the server clusters and store information indicating the deployment status for each of the server clusters. FIG. 4 shows an example of a data structure 400 storing a deployment status for server clusters during software deployment, in accordance with some implementations. As shown in this example, the deployment status may be maintained for each of the server clusters 1-N. The deployment status for a given server cluster may indicate whether deployment of the software has been initiated and/or completed for that cluster.

In some implementations, the deployment status for a given server cluster may indicate an actual deployment time at which software deployment for that cluster was initiated and/or completed. In this example, the deployment status for server cluster 3 indicates that the actual deployment time is 1:15 and the deployment status for server cluster 1 indicates that the actual deployment time is 3:35. The deployment status for server clusters 2 and N indicate that deployment has not been initiated for either of the server clusters.

In accordance with various implementations, the deployment status for a given server cluster may include a completion status that indicates whether deployment for that server cluster has been initiated and/or completed. In some implementations, the completion status includes a Boolean value that indicates whether deployment of the software has been completed for a corresponding server cluster. In other implementations, the completion status for a server cluster may indicate whether deployment has been initiated and completed, initiated but not completed, or not yet initiated. In this example, the completion status "C" for cluster 3 indicates that deployment of the software for that cluster has been completed and the completion status "I" for cluster 1 indicates that deployment of the software for that cluster has been initiated but not completed.

A deployment manager may update the deployment status for a server cluster upon initiating or completing deployment of software for the server cluster. In some implementations, the deployment status of each of the server clusters may be maintained for use in generating, applying, or updating a deployment plan, as will be described in further detail below.

Figure 5A:
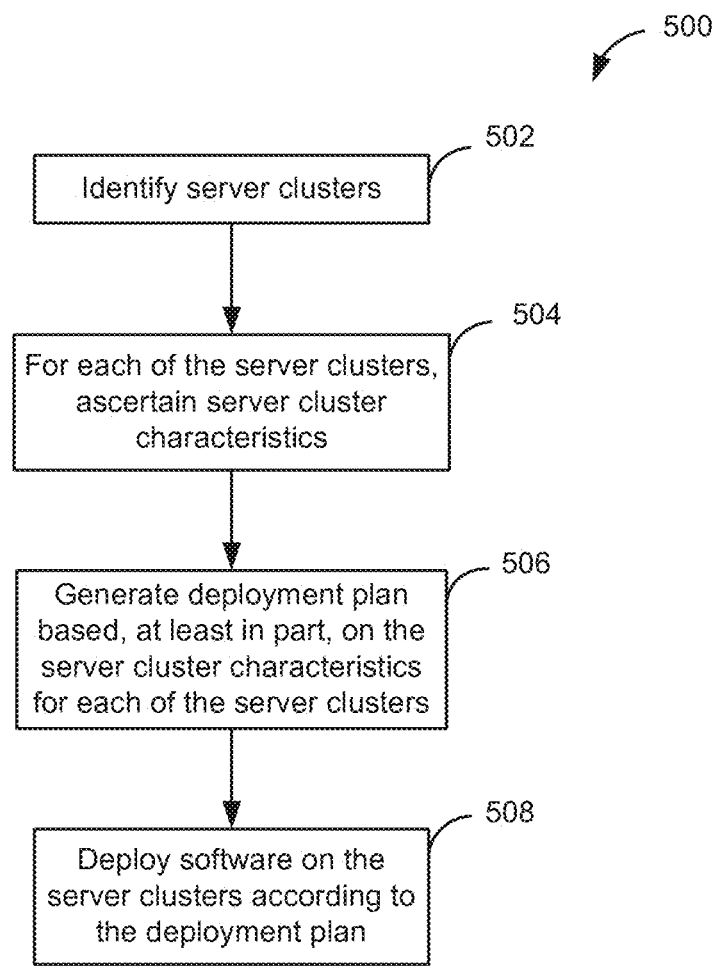
FIG. 5A shows an example of a method 500 for facilitating deployment of software on server clusters, in accordance with some implementations.

FIG. 5A shows an example of a method 500 for facilitating deployment of software on server clusters, in accordance with some implementations. A deployment manager may identify a plurality of server clusters on which to deploy software including a set of computer-readable instructions at 502. In some implementations, the server clusters may be identified in a file such as a configuration file. For example, a configuration file and/or other file(s) can include a server cluster identifier for each of the server clusters, as well as server identifiers for servers within each server cluster. A server identifier can include, for example, an IP address or MAC address. Each of the server clusters can include a plurality of servers.

For each server cluster of the plurality of server clusters, server cluster characteristics may be ascertained at 504. For example, the deployment manager may retrieve server cluster characteristics associated with the server clusters from data structure(s) stored in storage medium(s). Server cluster characteristics for a given server cluster can include, but are not limited to, a risk rating, an amount of traffic processed by the server cluster, a type of traffic processed by the server cluster, and/or a size of the server cluster. In some implementations, the server cluster characteristics that are ascertained for each of the server clusters includes the risk rating, the amount of traffic processed by the server cluster, and the size of the server cluster.

The deployment manager may generate a deployment plan based, at least in part, on the server cluster characteristics for each of the server clusters at 506. Generation of a deployment plan can include creating a deployment plan or updating an existing deployment plan. The deployment plan may indicate a deployment order in which the software is to be deployed on the server clusters and a deployment timing with which the software is to be deployed on the server clusters. In some implementations, the deployment plan may be generated further based, at least in part, on characteristics of the software. For example, characteristics of the software such as number of files and/or size of the files can be used to ascertain the estimated time to deploy the software to a particular server or server cluster.

In some implementations, the deployment order is determined based, at least in part, on the risk rating of each of the server clusters. For example, deployment for those server clusters having the highest risk rating may be initiated later than those server clusters having a lower risk rating. This may be desirable since deployment may be delayed until confidence in the success of the deployment process has been established. As another example, deployment for those server clusters having the highest risk rating may be initiated prior to those server clusters having a lower risk rating.

In some implementations, the deployment plan may be generated or updated based, at least in part, on the size of the server clusters. More particularly, the deployment order in which the software is to be deployed on the server clusters may be determined based, at least in part, on the size of the server clusters. For example, deployment on a server cluster including a larger number of servers may be prioritized over deployment on other server clusters including a smaller number of servers. As another example, deployment on a server cluster including a small number of servers may be prioritized over deployment on other server clusters including a larger number of servers. In addition, the deployment timing may be determined based, at least in part, on the size of the server clusters. For example, a greater amount of time may be allotted to deployment of software on a server cluster having 11 servers than to deployment of the software on a server cluster having 3 servers.

In some implementations, the deployment timing is determined based, at least in part, on historical data indicating an approximate amount of time that deployment of the software on a server or server cluster of a particular size will take. The historical data may pertain to a prior version of the software or other software having a similar number of files or file size as the software being deployed. The deployment timing of the deployment plan may be updated in real-time, as will be described in further detail below.

In some implementations, the deployment plan is generated or updated based, at least in part, on a desired or goal total deployment time in which the deployment of the software on the server clusters is to be completed. For example, deployment times for the server clusters may be scheduled such that the software deployment will be completed within the goal total deployment time. An indication of the desired total deployment time may be obtained, for example, from a user via a GUI or configuration file.

In some implementations, a software deployment type may indicate an urgency or importance of the software deployment. Each of a plurality of software deployment types may be mapped to a corresponding one of a plurality of goal total deployment times. Each goal total deployment time may represent a total amount of time designated or allocated to complete a software deployment. Thus, an indication of the goal total deployment time may include an indication of the software deployment type. Example software deployment types may include, for example, major, minor, patch, emergency, and/or custom. An emergency software deployment may have a goal total deployment time that is much smaller than a major software deployment.

In some implementations, the deployment plan may be generated or updated based, at least in part, on a type of the traffic processed by each server cluster. For example, deployment on a server cluster processing a particular type of traffic may be prioritized over deployment on other server clusters processing a different type of traffic. Examples of types of traffic include, but are not limited to, search traffic, test traffic, and production traffic.

In some implementations, the deployment plan may be generated or updated based, at least in part, on an amount of traffic processed by each server cluster. For example, deployment on a server cluster processing a large amount of traffic may be prioritized over deployment on other server clusters processing a smaller amount of traffic. As another example, deployment on a server cluster processing a small amount of traffic may be prioritized over deployment on other server clusters processing a larger amount of traffic.

In some implementations, the deployment manager ascertains, for each of the server clusters, a cluster value of the server cluster based, at least in part, on the amount of traffic processed by the server cluster and the size of the server cluster. The deployment manager may generate the deployment plan based, at least in part, on the risk rating and cluster value of each of the server clusters.

The deployment manager may use a configuration file to identify or retrieve the software or associated files to be deployed. Alternatively, the software or associated files may be submitted or identified by a user via a graphical user interface (GUI) of the deployment manager.

The deployment manager may deploy the software on the server clusters based, at least in part, on the deployment plan at 508. The software may include an initial version of an application or a subsequent version of an application that has previously been installed on the server clusters. Alternatively, the software may include a software update to a first version of an application running on the server clusters. In other words, the software update may include only those portions of the first version of the application that have been modified. Stated another way, the software update may reflect differences between the first version of the application and a second version of the application.

Deployment can include transmitting a copy of the software to each of the server clusters. Thus, deployment can include storing a copy of the software to memory of each of the server clusters. The deployment on each of the servers in a server cluster may be performed by the deployment manager. Alternatively, the deployment manager may offload deployment of the software onto a set of servers.

In some implementations, the deployment manager updates the deployment plan in real-time based, at least in part, on the deployment status of the deployment of the software on the server clusters. More particularly, the deployment manager may initiate deployment (e.g., installation) of the software on at least a first one of the server clusters according to the deployment plan. The deployment manager may dynamically update the deployment timing of the deployment plan based, at least in part, on a status of deployment of the software on at least a subset of the server clusters on which the software has been deployed. The deployment manager may then initiate deployment of the software on at least a second one of the server clusters according to the updated deployment timing.

In some implementations, the deployment manager initiates deployment (e.g., installation) of the software on at least a first one of the server clusters according to the deployment plan. The deployment plan is dynamically updated based, at least in part, on 1) the risk rating of at least a first subset of the server clusters on which the software has not been deployed and 2) a status of deployment of the software on at least a second subset of the server clusters on which the software has been deployed. The deployment manager may then initiate deployment of the software on at least a second one of the server clusters according to the updated deployment timing.

For example, the deployment manager may determine a particular deployment time associated with a particular server cluster in the first subset of the server clusters based, at least in part, on the risk rating of the particular server cluster and a status of deployment of the software on the second subset of the server clusters. The deployment plan be updated such that the deployment timing indicates the particular deployment time associated with the particular server cluster. The software may then be installed on the particular server cluster at the particular deployment time.

The status of deployment of the software may be represented by a confidence measure. The confidence measure may also indicate a likelihood or probability of successful deployment on the server clusters.

In some implementations, the deployment plan is updated in real-time during deployment to minimize deployment risk based, at least in part, upon a confidence measure that indicates a level of success of the deployment on the server clusters. More particularly, the order in which the deployment proceeds on the server clusters and/or the timing with which the deployment proceeds on the server clusters may be updated based, at least in part, on the confidence measure. For example, the scheduled deployment time (or associated scheduled elapsed time) for at least one server cluster may be updated or delayed (e.g., increased). The confidence measure may be updated by the deployment manager during the deployment either periodically or in response to an event such as completion of deployment on one of the server clusters.

In some implementations, a confidence measure is a measure of the health of the software deployment on those clusters for which deployment has been completed. More particularly, confidence increases with time for which a server cluster is running healthy with the software that has been deployed. For example, a server cluster running the software for a week provides more confidence than the same server cluster running for only a day with the same software. Therefore, the confidence measure may calculated based, at least in part, on the time $T_i$ that has elapsed since the completion of the software deployment for each corresponding server cluster i for which deployment has been completed by the deployment manager.

Confidence may also be higher when a server cluster is running a more representative data of customer traffic. For example, a production cluster that processes actual customer traffic provides greater confidence than a similar sized server cluster that processes test traffic for the same time period. In some implementations, the confidence measure may be calculated based, at least in part, on the type of traffic processed by those server clusters on which software deployment has been completed. More particularly, a traffic relevance weight Wt associated with the type of traffic processed one of the server clusters for which deployment has been completed may be obtained via a lookup in a database and the confidence measure may be calculated based, at least in part, on the traffic relevance weight Wt.

Similarly, confidence may be higher for a larger server cluster running the software than for a smaller server cluster running the same software. For example, a software deployment for a server cluster having 100 servers may provide a greater confidence than a server cluster having 10 servers. In some implementations, the confidence measure may be calculated based, at least in part, on the size of those server clusters on which software deployment has been completed. More particularly, a cluster size weight Ws associated with the size of a server cluster for which deployment has been completed may be obtained (e.g., via a lookup in a database) and the confidence measure may be calculated based, at least in part, on the cluster size weight Ws.

Moreover, confidence may be higher for a cluster processing a greater amount of traffic than another cluster processing less traffic for the same time period. For example, a server cluster processing 2 billion requests per day may provide a higher confidence than another server cluster processing 1 billion requests per day. In some implementations, the confidence measure may be calculated based, at least in part, on the amount of traffic processed by those server clusters on which software deployment has been completed. More particularly, a usage scale weight Wu associated with the amount of traffic processed by a server cluster for which deployment has been completed may be obtained (e.g., via a lookup in a database) and the confidence measure may be calculated based, at least in part, on the usage scale weight Wu.

In some implementations, the deployment manager calculates a confidence measure that is used in conjunction with the deployment plan to manage the deployment. More particularly, the deployment manager may identify a subset of the server clusters on which the software has been deployed. For example, the subset of the server clusters on which deployment has been completed may be identified from a database. For each server cluster in the subset of server clusters, a time that has elapsed since deployment of the software on the server cluster may be ascertained based upon the current time and the time at which deployment of the software on the server cluster was completed. In addition, server characteristics may be obtained for each server cluster in the subset of server clusters. For example, server characteristics such as traffic type, cluster size, and/or amount of traffic processed over a particular time period may be obtained. A confidence measure of a status of deployment of the software on the server clusters may be updated or calculated based, at least in part, on the time that has elapsed since deployment of the software on each server cluster in the subset of the server clusters and/or the server characteristics of each server cluster in the subset of the server clusters.

In some implementations, an individual cluster confidence measure may be calculated for each server cluster in a subset of the server clusters on which deployment is completed and the confidence measure for a software deployment may be calculated based, at least in part, by summing the individual cluster confidence measures associated with those server clusters in the subset of server clusters. The confidence measure for a software deployment may include a sum of individual server cluster confidence measures $CM_i$ for the individual i server clusters involved in a software deployment, as follows:

Confidence measure for software deployment=$\Sigma CM_i$

An individual cluster confidence measure $CM_i$ for a single server cluster may be calculated for server cluster i as follows:

$CM_i = T_i * C_i$, where $C_i$ is the cluster-weight for that cluster and $T_i$ is the period of time that has elapsed since completion of the software-deployment on the cluster i. The cluster weight $C_i$ for a cluster i may include a product of all weights for that server cluster. For example, the cluster-weight $C_i$ for cluster i may be calculated as follows:

$C_i = W_t * W_s * W_u$, where $W_t$ represents a traffic relevance weight, $W_s$ represents a cluster size weight, and $W_u$ represents a usage scale weight.

The time that has elapsed since completion of a software deployment on a particular cluster $T_i$ may be obtained by subtracting the time at which deployment of the software on the cluster was completed from the current time. The time at which deployment of the software on the cluster was completed may be obtained via a lookup in a database. For example, the deployment manager may access a data structure such as that illustrated in FIG. 4 to obtain a deployment completion time for the server cluster.

In some implementations, the confidence measure may be obtained by summing the individual cluster confidence measures $CM_i$ for all clusters involved in the deployment (or all clusters on which the software has been deployed), as represented below:

$\Sigma(T_i * C_i)$

In some implementations, the confidence measure may be updated from a previous confidence measure, which may be initialized to an initial confidence measure at the start of the deployment. More particularly, a time $TE_i$ that has elapsed since a previous confidence measure calculation may be used to update the previous confidence measure. For example, an update to the previous confidence measure may be calculated as follows:

$\Sigma(TE_i * C_i)$, where the updated confidence measure for the software deployment is calculated as follows:

Confidence measure=previous confidence measure+$\Sigma(TE_i * C_i)$

In some implementations, the update to the confidence measure is normalized by multiplying the update to the confidence measure by a normalization factor N to obtain the confidence measure for the software deployment, as follows:

Confidence measure=previous confidence measure+$N * \Sigma(TE_i * C_i)$

In some implementations, the confidence measure and/or normalization factor N may be calculated based, at least in part, on the goal total deployment time for the software update. For example, the normalization factor N may be calculated as follows:

$N = 20/(P * \Sigma Wc_i)$, where P represents the goal total deployment time for the software update and $\Sigma Wc_i$ represents the sum of all weights used to generate all of the cluster weights C.

Figure 5B:
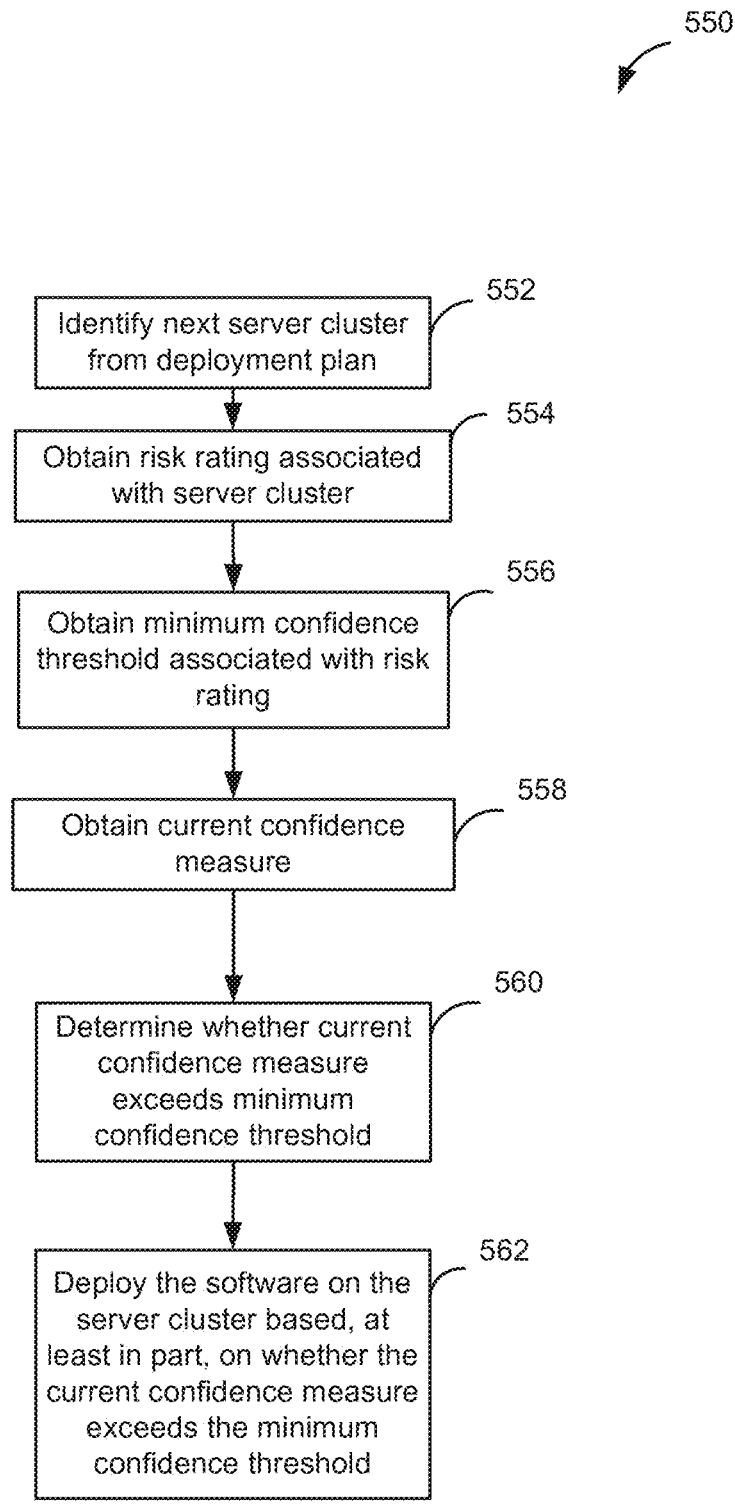
FIG. 5B shows an example of a method 550 for deploying software on server clusters according to a confidence measure, in accordance with some implementations.

FIG. 5B shows an example of a method 550 for deploying software on server clusters according to a confidence measure, in accordance with some implementations. As shown at 552, a deployment manager may identify a next server cluster from the deployment plan. For example, deployment manager may identify the next server cluster on which software is to be deployed from the deployment plan. The deployment manager may also verify that, prior to deploying the software on the cluster, that the current time is equal to or after the scheduled deployment time for the server cluster.

In some implementations, each of the server clusters is associated with one of a plurality of possible risk ratings. Thus, the deployment manager may obtain a risk rating associated with the server cluster at 554. For example, the risk rating for the server cluster may be ascertained by looking up the risk rating for the particular server cluster in a server cluster-risk rating mapping data structure.

In some implementations, each of the risk ratings is associated with a corresponding minimum confidence threshold above which deployment can proceed for a server cluster having that risk rating. For example, a low risk rating of 1 may have an associated minimum confidence threshold of 10 percent while a high risk rating of 5 may have an associated minimum confidence threshold of 80 percent.

The deployment manager may obtain a minimum confidence threshold associated with the risk rating of the server cluster at 556. For example, the minimum confidence threshold for the risk rating may be ascertained by looking up the minimum confidence threshold for the risk rating in a risk rating-minimum confidence threshold mapping data structure.

The deployment manager may obtain a current confidence measure at 558. The current confidence measure may reflect the most recently calculated confidence measure. More particularly, the current confidence measure may be calculated or updated, as described above.

The deployment manager may then compare the current confidence measure with the minimum confidence threshold for the risk rating and server cluster at 560. The deployment manager may then proceed with deployment of the software on the server cluster at 562 based, at least in part, on whether the current confidence measure exceeds the minimum confidence threshold. More particularly, where the current confidence measure is greater than the minimum confidence threshold, deployment of the software for the server cluster may proceed. However, where the current confidence measure is less than the minimum confidence threshold, deployment for the server cluster may be delayed until the confidence measure improves. In this instance, another server cluster that is identified next in the deployment order (e.g., following the particular server cluster in the deployment order) may be updated if the confidence measure exceeds its corresponding minimum confidence threshold.

In some implementations, the deployment timing and/or deployment order of the deployment plan may be updated based, at least in part, on the current confidence measure and the risk rating for a particular server cluster. More particularly, the scheduled deployment time or associated scheduled "elapsed time" may be updated for one or more of the server clusters according to whether the current confidence measure exceeds a minimum confidence threshold associated with the risk rating for the particular server cluster. For example, a time delay may be introduced prior to deploying the software on the particular server cluster and this time delay could impact the timing and/or order of deployment of the software on further server clusters.

The deployment may continue at 552 for remaining server clusters in the server cluster for which software deployment has not been completed. Upon completion of the deployment of the software on all of the server clusters, the deployment manager may provide a notification indicating that the deployment was successfully completed. Such a notification may be provided via a GUI or transmitted via an electronic mail message, a text message, an instant message, or another form of notification.

In some but not all implementations, the disclosed methods, apparatus, systems, and computer program products may be configured or designed for use in a multi-tenant database environment. For example, a web page rendered by a browser at a user's client device may include data maintained by a multi-tenant database system. The term "multi-tenant database system" generally refers to those systems in which various elements of hardware and/or software of a database system may be shared by one or more customers. For example, a given application server may simultaneously process requests for a great number of customers, and a given database table may store records, which include rows of data, for a potentially much greater number of customers.

In some implementations, user profiles may be maintained in association with users of the system. An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

Some non-limiting examples of systems, apparatus, and methods are described below for implementing database systems and enterprise level networking systems in conjunction with the disclosed techniques.

Figure 6A:
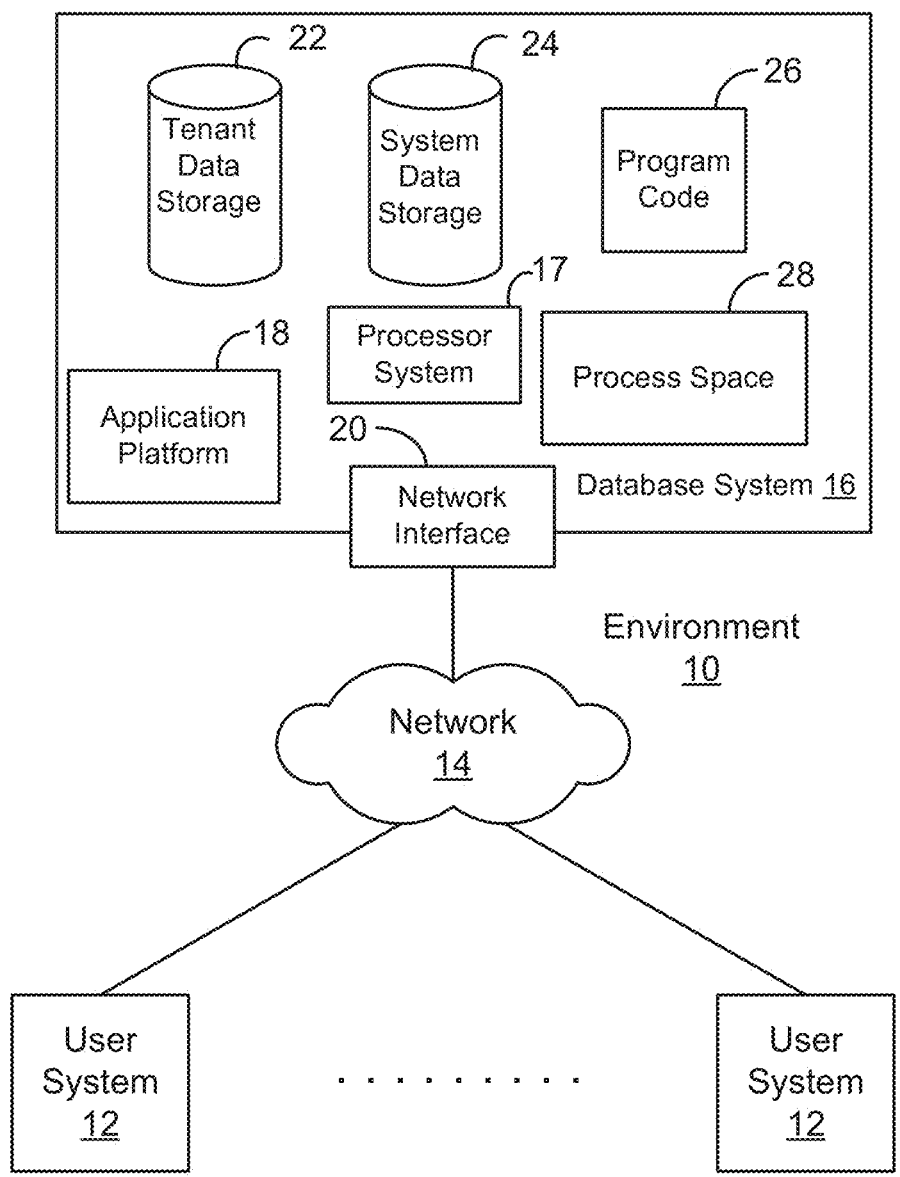
FIG. 6A shows a block diagram of an example of an environment 10 in which an on-demand database service can be used in accordance with some implementations.

FIG. 6A shows a block diagram of an example of an environment 10 in which an on-demand database service can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

Environment 10 is an environment in which an on-demand database service exists. User system 12 may be implemented as any computing device(s) or other data processing apparatus such as a machine or system that is used by a user to access a database system 16. For example, any of user systems 12 can be a handheld computing device, a mobile phone, a laptop computer, a work station, and/or a network of such computing devices. As illustrated in FIG. 6A (and in more detail in FIG. 6B) user systems 12 might interact via a network 14 with an on-demand database service, which is implemented in the example of FIG. 6A as database system 16.

An on-demand database service, implemented using system 16 by way of example, is a service that is made available to outside users, who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the "Internet" with a capital "I." The Internet will be used in many of the examples herein. However, it should be understood that the networks that the present implementations might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 6A, implements a web-based customer relationship management (CRM) system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 6B:
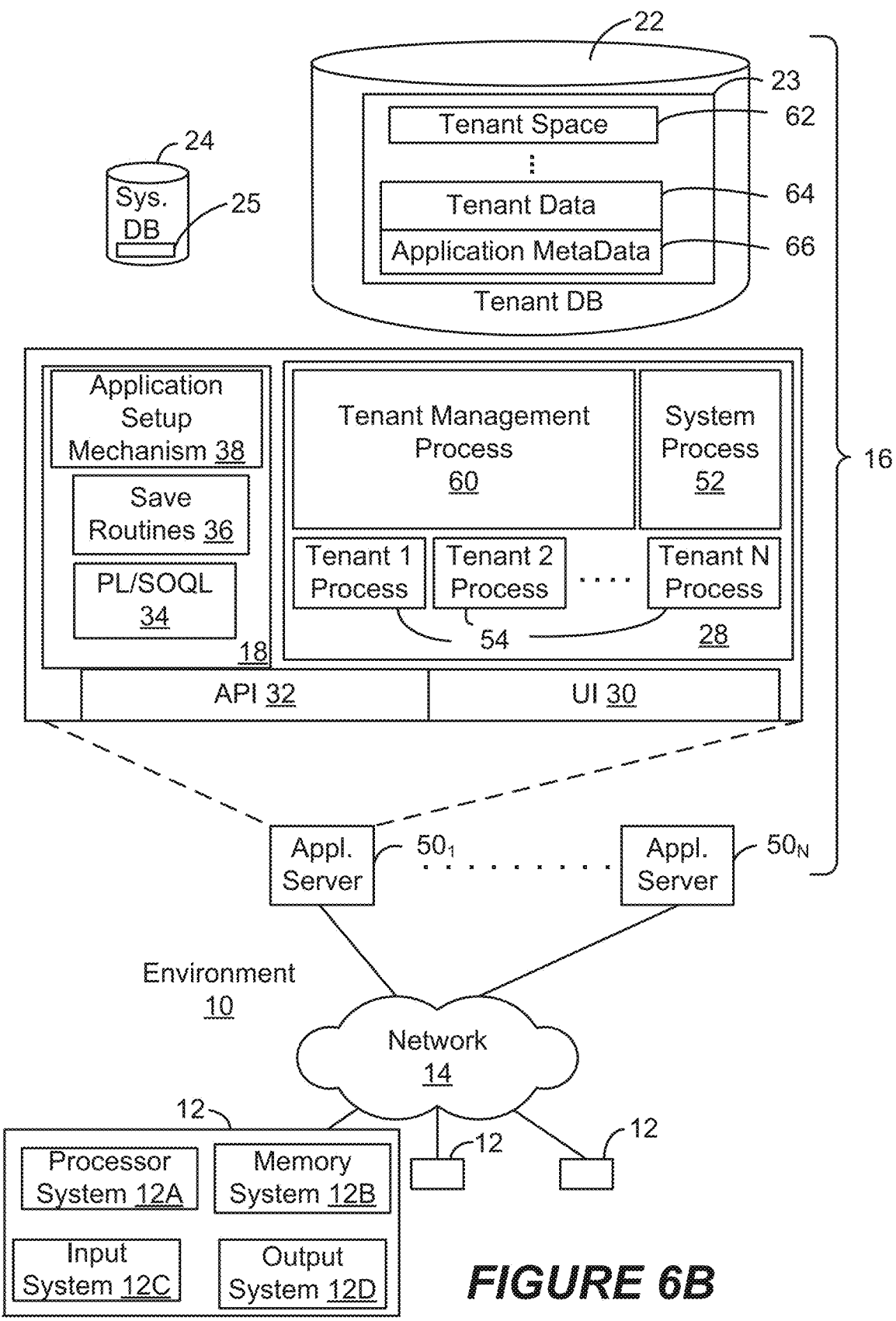
FIG. 6B shows a block diagram of an example of some implementations of elements of FIG. 8A and various possible interconnections between these elements.

One arrangement for elements of system 16 is shown in FIGS. 6A and 6B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 6A include conventional, well-known elements that are explained only briefly here. For example, each user system 12 could include a desktop personal computer, workstation, laptop, PDA, tablet, smartphone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a graphical user interface (GUI) provided by the browser on a display (e.g., a monitor screen, LCD display, etc.) of the computing device in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to a computing device or system, including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 6B shows a block diagram of an example of some implementations of elements of FIG. 6A and various possible interconnections between these elements. That is, FIG. 6B also illustrates environment 10. However, in FIG. 6B elements of system 16 and various interconnections in some implementations are further illustrated. FIG. 6B shows that user system 12 may include processor system 12A, memory system 12B, input system 12C, and output system 12D. FIG. 6B shows network 14 and system 16. FIG. 6B also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 6A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 6B, system 16 may include a network interface 20 (of FIG. 6A) implemented as a set of HTTP application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 7A:
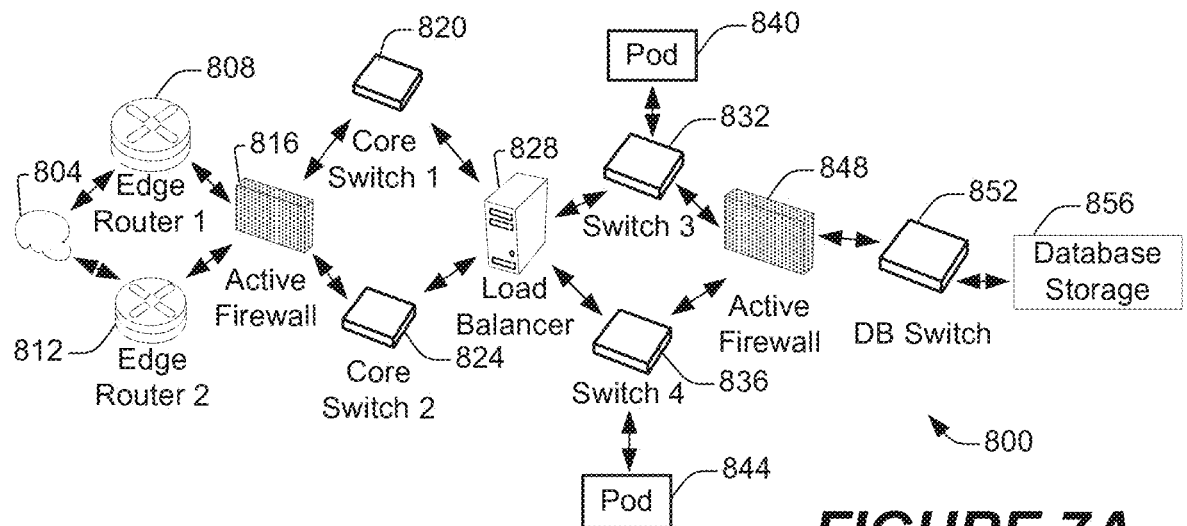
FIG. 7A shows a system diagram of an example of architectural components of an on-demand database service environment 900, in accordance with some implementations.

FIG. 7A shows a system diagram illustrating an example of architectural components of an on-demand database service environment 800 according to some implementations. A client machine located in the cloud 804, generally referring to one or more networks in combination, as described herein, may communicate with the on-demand database service environment via one or more edge routers 808 and 812. A client machine can be any of the examples of user systems 12 described above. The edge routers may communicate with one or more core switches 820 and 824 via firewall 816. The core switches may communicate with a load balancer 828, which may distribute server load over different pods, such as the pods 840 and 844. The pods 840 and 844, which may each include one or more servers and/or other computing resources, may perform data processing and other operations used to provide on-demand services. Communication with the pods may be conducted via pod switches 832 and 836. Components of the on-demand database service environment may communicate with a database storage 856 via a database firewall 848 and a database switch 852.

Figure 7B:
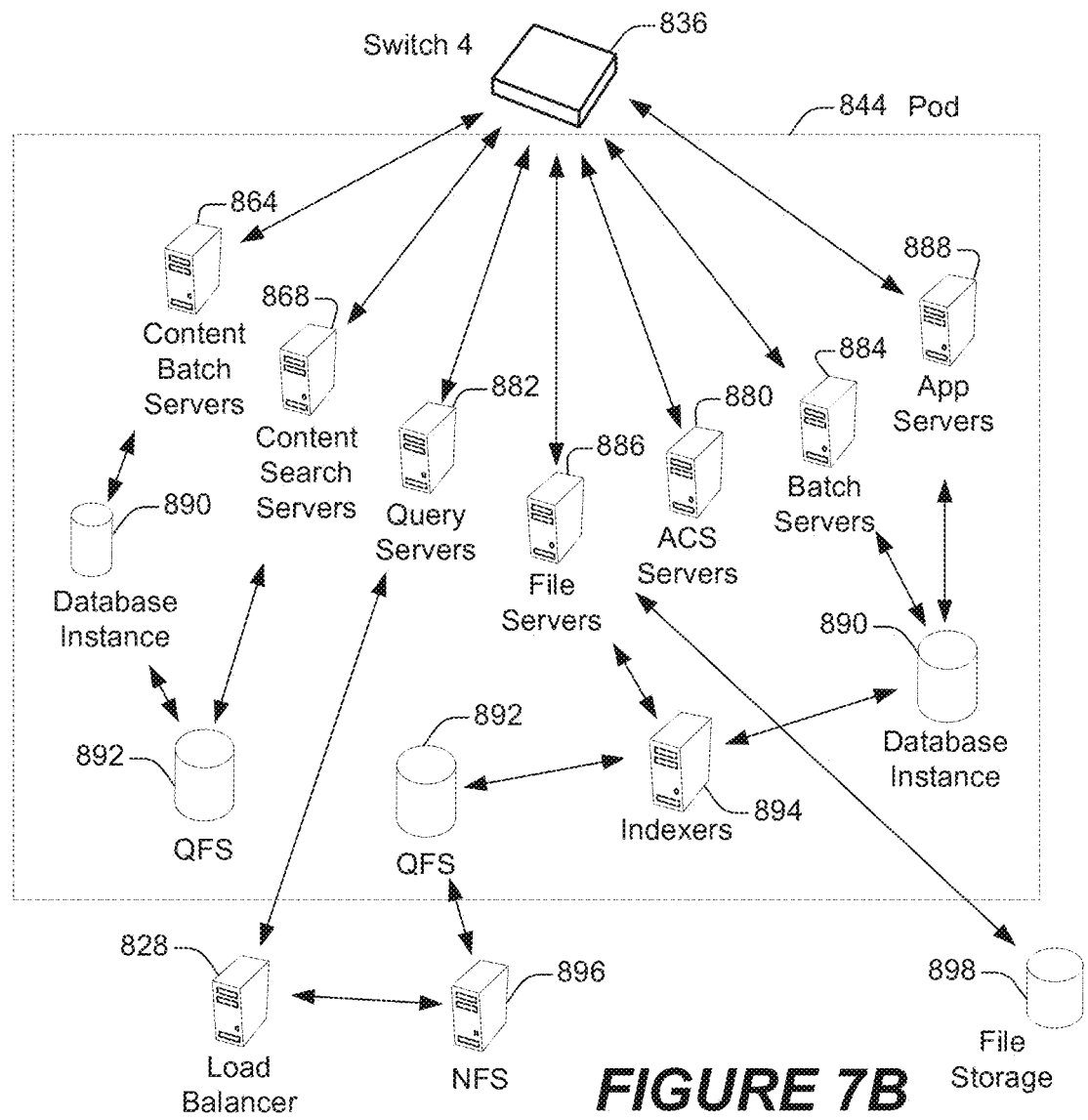
FIG. 7B shows a system diagram further illustrating an example of architectural components of an on-demand database service environment, in accordance with some implementations.

As shown in FIGS. 7A and 7B, accessing an on-demand database service environment may involve communications transmitted among a variety of different hardware and/or software components. Further, the on-demand database service environment 800 is a simplified representation of an actual on-demand database service environment. For example, while only one or two devices of each type are shown in FIGS. 7A and 7B, some implementations of an on-demand database service environment may include anywhere from one to many devices of each type. Also, the on-demand database service environment need not include each device shown in FIGS. 7A and 7B, or may include additional devices not shown in FIGS. 7A and 7B.

Moreover, one or more of the devices in the on-demand database service environment 800 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 804 is intended to refer to a data network or plurality of data networks, often including the Internet. Client machines located in the cloud 804 may communicate with the on-demand database service environment to access services provided by the on-demand database service environment. For example, client machines may access the on-demand database service environment to retrieve, store, edit, and/or process information.

In some implementations, the edge routers 808 and 812 route packets between the cloud 804 and other components of the on-demand database service environment 800. The edge routers 808 and 812 may employ the Border Gateway Protocol (BGP). The BGP is the core routing protocol of the Internet. The edge routers 808 and 812 may maintain a table of IP networks or 'prefixes', which designate network reachability among autonomous systems on the Internet.

In one or more implementations, the firewall 816 may protect the inner components of the on-demand database service environment 800 from Internet traffic. The firewall 816 may block, permit, or deny access to the inner components of the on-demand database service environment 800 based upon a set of rules and other criteria. The firewall 816 may act as one or more of a packet filter, an application gateway, a stateful filter, a proxy server, or any other type of firewall.

In some implementations, the core switches 820 and 824 are high-capacity switches that transfer packets within the on-demand database service environment 800. The core switches 820 and 824 may be configured as network bridges that quickly route data between different components within the on-demand database service environment. In some implementations, the use of two or more core switches 820 and 824 may provide redundancy and/or reduced latency.

In some implementations, the pods 840 and 844 may perform the core data processing and service functions provided by the on-demand database service environment. Each pod may include various types of hardware and/or software computing resources. An example of the pod architecture is discussed in greater detail with reference to FIG. 7B.

In some implementations, communication between the pods 840 and 844 may be conducted via the pod switches 832 and 836. The pod switches 832 and 836 may facilitate communication between the pods 840 and 844 and client machines located in the cloud 804, for example via core switches 820 and 824. Also, the pod switches 832 and 836 may facilitate communication between the pods 840 and 844 and the database storage 856.

In some implementations, the load balancer 828 may distribute workload between the pods 840 and 844. Balancing the on-demand service requests between the pods may assist in improving the use of resources, increasing throughput, reducing response times, and/or reducing overhead. The load balancer 828 may include multilayer switches to analyze and forward traffic.

In some implementations, access to the database storage 856 may be guarded by a database firewall 848. The database firewall 848 may act as a computer application firewall operating at the database application layer of a protocol stack. The database firewall 848 may protect the database storage 856 from application attacks such as structure query language (SQL) injection, database rootkits, and unauthorized information disclosure.

In some implementations, the database firewall 848 may include a host using one or more forms of reverse proxy services to proxy traffic before passing it to a gateway router. The database firewall 848 may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some implementations, communication with the database storage 856 may be conducted via the database switch 852. The multi-tenant database storage 856 may include more than one hardware and/or software components for handling database queries. Accordingly, the database switch 852 may direct database queries transmitted by other components of the on-demand database service environment (e.g., the pods 840 and 844) to the correct components within the database storage 856.

In some implementations, the database storage 856 is an on-demand database system shared by many different organizations. The on-demand database system may employ a multi-tenant approach, a virtualized approach, or any other type of database approach. An on-demand database system is discussed in greater detail with reference to FIGS. 7A and 7B.

FIG. 7B shows a system diagram further illustrating an example of architectural components of an on-demand database service environment according to some implementations. The pod 844 may be used to render services to a user of the on-demand database service environment 800. In some implementations, each pod may include a variety of servers and/or other systems. The pod 844 includes one or more content batch servers 864, content search servers 868, query servers 882, file servers 886, access control system (ACS) servers 880, batch servers 884, and app servers 888. Also, the pod 844 includes database instances 890, quick file systems (QFS) 892, and indexers 894. In one or more implementations, some or all communication between the servers in the pod 844 may be transmitted via the switch 836.

In some implementations, the app servers 888 may include a hardware and/or software framework dedicated to the execution of procedures (e.g., programs, routines, scripts) for supporting the construction of applications provided by the on-demand database service environment 800 via the pod 844. In some implementations, the hardware and/or software framework of an app server 888 is configured to execute operations of the services described herein, including performance of the blocks of methods described with reference to FIGS. 1-4. In alternative implementations, two or more app servers 888 may be included and cooperate to perform such methods, or one or more other servers described herein can be configured to perform the disclosed methods.

The content batch servers 864 may handle requests internal to the pod. These requests may be long-running and/or not tied to a particular customer. For example, the content batch servers 864 may handle requests related to log mining, cleanup work, and maintenance tasks.

The content search servers 868 may provide query and indexer functions. For example, the functions provided by the content search servers 868 may allow users to search through content stored in the on-demand database service environment.

The file servers 886 may manage requests for information stored in the File storage 898. The File storage 898 may store information such as documents, images, and basic large objects (BLOBs). By managing requests for information using the file servers 886, the image footprint on the database may be reduced.

The query servers 882 may be used to retrieve information from one or more file systems. For example, the query system 882 may receive requests for information from the app servers 888 and then transmit information queries to the NFS 896 located outside the pod.

The pod 844 may share a database instance 890 configured as a multi-tenant environment in which different organizations share access to the same database. Additionally, services rendered by the pod 844 may call upon various hardware and/or software resources. In some implementations, the ACS servers 880 may control access to data, hardware resources, or software resources.

In some implementations, the batch servers 884 may process batch jobs, which are used to run tasks at specified times. Thus, the batch servers 884 may transmit instructions to other servers, such as the app servers 888, to trigger the batch jobs.

In some implementations, the QFS 892 may be an open source file system available from Sun Microsystems® of Santa Clara, Calif. The QFS may serve as a rapid-access file system for storing and accessing information available within the pod 844. The QFS 892 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 868 and/or indexers 894 to identify, retrieve, move, and/or update data stored in the network file systems 896 and/or other storage systems.

In some implementations, one or more query servers 882 may communicate with the NFS 896 to retrieve and/or update information stored outside of the pod 844. The NFS 896 may allow servers located in the pod 844 to access information to access files over a network in a manner similar to how local storage is accessed.

In some implementations, queries from the query servers 822 may be transmitted to the NFS 896 via the load balancer 828, which may distribute resource requests over various resources available in the on-demand database service environment. The NFS 896 may also communicate with the QFS 892 to update the information stored on the NFS 896 and/or to provide information to the QFS 892 for use by servers located within the pod 844.

In some implementations, the pod may include one or more database instances 890. The database instance 890 may transmit information to the QFS 892. When information is transmitted to the QFS, it may be available for use by servers within the pod 844 without using an additional database call.

In some implementations, database information may be transmitted to the indexer 894. Indexer 894 may provide an index of information available in the database 890 and/or QFS 892. The index information may be provided to file servers 886 and/or the QFS 892.

As multiple users might be able to change the data of a record, it can be useful for certain users to be notified when a record is updated. Also, even if a user does not have authority to change a record, the user still might want to know when there is an update to the record. For example, a vendor may negotiate a new price with a salesperson of company X, where the salesperson is a user associated with tenant Y. As part of creating a new invoice or for accounting purposes, the salesperson can change the price saved in the database. It may be important for co-workers to know that the price has changed. The salesperson could send an email to certain people, but this is onerous and the salesperson might not email all of the people who need to know or want to know. Accordingly, some implementations of the disclosed techniques can inform others (e.g., co-workers) who want to know about an update to a record automatically.

The tracking and reporting of updates to a record stored in a database system can be facilitated with a multi-tenant database system 16, e.g., by one or more processors configured to receive or retrieve information, process the information, store results, and transmit the results. In other implementations, the tracking and reporting of updates to a record may be implemented at least partially with a single tenant database system.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

While the disclosed examples are often described herein with reference to an implementation in which an on-demand database service environment is implemented in a system having an application server providing a front end for an on-demand database service capable of supporting multiple tenants, the present implementations are not limited to multi-tenant databases nor deployment on application servers. Implementations may be practiced using other database architectures, i.e., ORACLE®, DB2® by IBM and the like without departing from the scope of the implementations claimed.

It should be understood that some of the disclosed implementations can be embodied in the form of control logic using hardware and/or using computer software in a modular or integrated manner. Other ways and/or methods are possible using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer-readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising: a database system implemented using a server system, the database system configurable to cause: identifying a plurality of server clusters on which to deploy software including a set of computer-readable instructions, each of the server clusters including a plurality of servers; retrieving a plurality of risk ratings, each of the risk ratings being associated with a corresponding one of the plurality of server clusters; ascertaining, for each server cluster of the plurality of server clusters, an amount of traffic processed by the server cluster and a size of the server cluster, the size of the server cluster indicating a number of servers in the server cluster; generating a deployment plan indicating a deployment order and a deployment timing based, at least in part, on the plurality of risk ratings, the amount of traffic processed by each of the server clusters, and the size of each of the server clusters, the deployment order indicating an order in which deployment is to proceed on the server clusters, the deployment timing indicating a timing with which the software is to be deployed on the server clusters; and deploying the software on the server clusters based, at least in part, on the deployment plan, wherein deploying the software includes: installing the software on at least a first one of the server clusters according to the deployment plan; dynamically updating the deployment plan based, at least in part, on 1) a minimum confidence measure threshold associated with the risk rating of a server cluster of a first subset of the server clusters on which the software has not been deployed and 2) a confidence measure of a status of deployment of the software on at least a second subset of the server clusters on which the software has been deployed; and installing the software on at least a second one of the server clusters according to the updated deployment plan.

2. The system as recited in claim 1, the server cluster of the first subset of the server clusters being the second one of the server clusters.

3. The system as recited in claim 1, the database system further configurable to cause: identifying the second subset of the server clusters on which the software has been deployed; ascertaining, for each server cluster in the second subset of the server clusters, a time that has elapsed since deployment of the software on the server cluster; updating the confidence measure of the status of deployment of the software on the second subset of the server clusters based, at least in part, on the time that has elapsed since deployment of the software on each server cluster in the second subset of the server clusters, the amount of traffic processed by each server cluster in the second subset of the server clusters, and the size of each server cluster in the second subset of the server clusters; and updating the deployment plan based, at least in part, on the confidence measure and a minimum confidence measure threshold associated with at least one of the first subset of the server clusters on which the software has not been deployed.

4. The system as recited in claim 1, wherein the software comprises a software update to a first software version running on the server clusters.

5. The system as recited in claim 1, the database system further configurable to cause determining the deployment order based, at least in part, on the risk ratings.

6. The system as recited in claim 1, the database system further configurable to cause generating the deployment plan further based, at least in part, on at least one of a) a total deployment time in which the deployment of the software on the server clusters is to be completed or b) a type of the traffic processed by each of the server clusters.

7. A computer program product comprising one or more non-transitory computer-readable media having computer-readable program code stored therein, the program code capable of being executed by one or more processors, the program code comprising computer-readable instructions configurable to cause: identifying a plurality of server clusters on which to deploy software including a set of computer-readable instructions, each of the server clusters including a plurality of servers; retrieving a plurality of risk ratings, each of the risk ratings being associated with a corresponding one of the plurality of server clusters; ascertaining, for each server cluster of the plurality of server clusters, an amount of traffic processed by the server cluster and a size of the server cluster, the size of the server cluster indicating a number of servers in the server cluster; generating a deployment plan indicating a deployment order and a deployment timing based, at least in part, on the plurality of risk ratings, the amount of traffic processed by each of the server clusters, and the size of each of the server clusters, the deployment order indicating an order in which deployment is to proceed on the server clusters, the deployment timing indicating a timing with which the software is to be deployed on the server clusters; and deploying the software on the server clusters based, at least in part, on the deployment plan, wherein deploying the software includes: installing the software on at least a first one of the server clusters according to the deployment plan; dynamically updating the deployment plan based, at least in part, on 1) a minimum confidence measure threshold associated with the risk rating of a server cluster of a first subset of the server clusters on which the software has not been deployed and 2) a confidence measure of a status of deployment of the software on at least a second subset of the server clusters on which the software has been deployed; and installing the software on at least a second one of the server clusters according to the updated deployment plan.

8. The computer program product as recited in claim 7, the server cluster of the first subset of the server clusters being the second one of the server clusters.

9. The computer program product as recited in claim 7, the program code comprising instructions further configurable to cause: identifying the second subset of the server clusters on which the software has been deployed; ascertaining, for each server cluster in the second subset of the server clusters, a time that has elapsed since deployment of the software on the server cluster; updating the confidence measure of the status of deployment of the software on the second subset of the server clusters based, at least in part, on the time that has elapsed since deployment of the software on each server cluster in the second subset of the server clusters, the amount of traffic processed by each server cluster in the second subset of the server clusters, and the size of each server cluster in the second subset of the server clusters; and updating the deployment plan based, at least in part, on the confidence measure and a minimum confidence measure threshold associated with at least one of the first subset of the server clusters on which the software has not been deployed.

10. The computer program product as recited in claim 7, the program code comprising instructions further configurable to cause: determining the deployment order based, at least in part, on the risk ratings.

11. The computer program product as recited in claim 7, the program code comprising instructions further configured to cause generating the deployment plan further based, at least in part, on at least one of a) a total deployment time in which the deployment of the software on the server clusters is to be completed or b) a type of the traffic processed by each of the server clusters.

12. A method, comprising: identifying a plurality of server clusters on which to deploy software including a set of computer-readable instructions, each of the server clusters including a plurality of servers; retrieving a plurality of risk ratings, each of the risk ratings being associated with a corresponding one of the plurality of server clusters; ascertaining, for each server cluster of the plurality of server clusters, an amount of traffic processed by the server cluster and a size of the server cluster, the size of the server cluster indicating a number of servers in the server cluster; generating a deployment plan indicating a deployment order and a deployment timing based, at least in part, on the plurality of risk ratings, the amount of traffic processed by each of the server clusters, and the size of each of the server clusters, the deployment order indicating an order in which deployment is to proceed on the server clusters, the deployment timing indicating a timing with which the software is to be deployed on the server clusters; and deploying the software on the server clusters based, at least in part, on the deployment plan, wherein deploying the software includes: installing the software on at least a first one of the server clusters according to the deployment plan; dynamically updating the deployment plan based, at least in part, on 1) a minimum confidence measure threshold associated with the risk rating of a server cluster of a first subset of the server clusters on which the software has not been deployed and 2) a confidence measure of a status of deployment of the software on at least a second subset of the server clusters on which the software has been deployed; and installing the software on at least a second one of the server clusters according to the updated deployment plan.

13. The method as recited in claim 12, the server cluster of the first subset of the server clusters being the second one of the server clusters.

14. The method as recited in claim 12, further comprising: identifying the second subset of the server clusters on which the software has been deployed; ascertaining, for each server cluster in the second subset of the server clusters, a time that has elapsed since deployment of the software on the server cluster; updating the confidence measure of the status of deployment of the software on the second subset of the server clusters based, at least in part, on the time that has elapsed since deployment of the software on each server cluster in the second subset of the server clusters, the amount of traffic processed by each server cluster in the second subset of the server clusters, and the size of each server cluster in the second subset of the server clusters; and updating the deployment plan based, at least in part, on the confidence measure and a minimum confidence measure threshold associated with at least one of the first subset of the server clusters on which the software has not been deployed.

15. The method as recited in claim 12, wherein the software comprises a software update to a first software version running on the server clusters.

16. The method as recited in claim 12, further comprising: determining the deployment order based, at least in part, on the risk ratings.

17. The method as recited in claim 12, wherein generating the deployment plan is performed further based, at least in part, on at least one of a) a total deployment time in which the deployment of the software on the server clusters is to be completed orb) a type of the traffic processed by each of the server clusters.

18. The method as recited in claim 12, wherein retrieving a plurality of risk ratings comprises: performing a lookup in a data structure to obtain, for each of the server clusters, a corresponding one of the plurality of risk ratings assigned to the server cluster.

19. The system as recited in claim 1, the database system further configurable to cause: performing a lookup in a data structure to obtain, for each of the server clusters, a corresponding one of the plurality of risk ratings assigned to the server cluster.

20. The computer program product as recited in claim 7, the program code comprising instructions further configured to cause: performing a lookup in a data structure to obtain, for each of the server clusters, a corresponding one of the plurality of risk ratings assigned to the server cluster.

* * * * *